(12) United States Patent
Lee (10) Patent No.: US 7,545,592 B2
(45) Date of Patent: Jun. 9, 2009

(54) FLYING HEIGHT MEASUREMENT METHOD AND SYSTEM (75) Inventor: Sang-hyub Lee, Suwon si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 988 days.

(21) Appl. No.: 10/735,631

(22) Filed: Dec. 16, 2003

(65) Prior Publication Data
US 2004/0145824 A1    Jul. 29, 2004

(30) Foreign Application Priority Data
Dec. 17, 2002    (KR)    ............... 10-2002-0080875

(51) Int. Cl.
*G11B 5/02*    (2006.01)
(52) U.S. Cl. ....................................... 360/25
(58) Field of Classification Search ............... None
See application file for complete search history.

(56) References Cited
U.S. PATENT DOCUMENTS 5,824,920 A * 10/1998 Sugimoto et al. .......... 73/865.8
5,863,237 A * 1/1999 Felts et al. .................. 451/41
5,880,899 A    3/1999 Blachek et al.
5,942,680 A * 8/1999 Boutaghou ................. 73/105
6,419,551 B1 * 7/2002 Smith ........................ 451/8
6,530,258 B2 * 3/2003 Brannon et al. ............ 73/1.89

FOREIGN PATENT DOCUMENTS

KR    2002-38720    5/2002

OTHER PUBLICATIONS

Notice of Office Action issued by the Korean Patent Office on Jan. 14, 2005 in Application No. 10-2002-0080875 with an English language translation thereof.

* cited by examiner

*Primary Examiner*—Mark Blouin
(74) *Attorney, Agent, or Firm*—Staas & Halsey LLP

(57) ABSTRACT

A flying height of a slider of a head assembly is measured by rotating a disk having at least one protrusion protruding higher than a minimum flying height of the head assembly subject to measurement, and cutting an upper end portion of the protrusion with the slider that is floating with respect to the disk. The cut protrusion is measured to determine the flying height of the slider of the head assembly.

10 Claims, 8 Drawing Sheets

| | |
|---|---|
| NanoScope | Tapping AFM |
| Scan size | 50.00 μM |
| Setpoint | 1.047 V |
| Scan rate | 0.3007 Hz |
| Number of samples | 512 |

X 10.000 μM/div
Z 100.000 nM/div

FIG. 6

| | |
|---|---|
| NanoScope | Tapping AFM |
| Scan size | 10.00 μM |
| Setpoint | 1.465 V |
| Scan rate | 0.4999 Hz |
| Number of samples | 512 |

X 2.000 μM/div
Z 30.000 nM/div

FLYING HEIGHT MEASUREMENT METHOD AND SYSTEM

CROSS-REFERENCE TO RELATED APPLICATIONS

This application claims the priority of Korean Patent Application No. 2002-80875 filed on 17 Dec. 2002 in the Korean Intellectual Property Office, the disclosure of which is incorporated herein in its entirety by reference.

BACKGROUND OF THE INVENTION

1. Field of the Invention

The present invention relates to a flying height measurement method and system, and more particularly, to a flying height measurement method and system which can measure the flying height of a hard disk drive head slider.

2. Description of the Related Art

In general, a hard disk is rotatably installed on a base inside a hard disk drive. The hard disk drive includes at least one magnetic head that corresponds to a recording/reproduction surface of a rotating hard disk, to write or read information by magnetizing or detecting a magnetic field of the hard disk surface.

The magnetic head is installed on an arm at an end of a magnetic head assembly that is installed on the base in the hard disk drive. The magnetic head is capable of pivoting and moving to an appropriate position on the hard disk under the guidance of the magnetic head assembly.

The magnetic head assembly includes an actuator arm rotatably coupled to a pivot shaft, and a suspension coupled to the actuator arm. At the end of the actuator arm is a magnetic head slider on which a magnetic head capable of recording and reproducing information with respect to the hard disk is attached.

The magnetic head slider is biased toward the hard disk by the suspension. When the hard disk begins to rotate, the magnetic head slider flies above the disk surface due to aerodynamic pressure generated by the rotation of the hard disk. When the magnetic head slider is in a floated state, a gap between the magnetic head provided on the magnetic head slider and the hard disk surface is referred to as the flying height (FH). The flying height is designed by a computer simulation.

Recently, to increase the capacity of a hard disk, the number of tracks per inch (TPI) is increased while the width of the track is decreased. To reduce the width of the track of a hard disk, the width of the write head of the magnetic head which inputs a magnetic signal to the hard disk needs to be reduced accordingly. Also, the flying height of the magnetic head needs to be lowered to read a magnetic field written on a track having a relatively small size by using a read head.

As described above, as hard disks increase storage capacity, one of the factors that is affected by an increase of the surface recording density of a hard disk is the flying height. Thus, accurately measuring the flying height is very important to reliable operation of a hard disk drive.

A conventional flying height measurement apparatus is used by which a flying height is calculated by illuminating light emitted from a light source to a magnetic head slider flying above a glass disk, through a glass disk, and measuring the strength of light reflected by the magnetic head slider. A single light source or a multi-light source to reduce a measurement error by the single light source can be used as the light source. The glass disk can transmit light.

The flying height can be calculated by measuring the intensity of the interference light by comparing the light reflected by the surface of the glass disk and the light reflected by the magnetic head slider.

However, the flying height is affected by the degree of roughness of the surface of a disk in use, the substance of the disk, and its mechanical features. Accordingly, because the glass disk used in the flying height measurement apparatus is different from a hard disk, the flying height of the magnetic head with respect to the hard disk cannot be properly obtained by the above flying height measurement method.

Also, since the flying height is designed to be very low because of the high capacity of the hard disk, the above flying height measurement apparatus using light approximates to a limit in the measurement. This is because the flying height is too low so that a resolution power is limited due to the wavelength of light used in the measurement method. Thus, when the flying height is designed lower, a problem may be generated in the reliability of a measured value in the above measurement method using light and the measurement of the flying height designed by a simulation has a limit.

SUMMARY OF THE INVENTION

To solve the above and/or other problems, the present invention provides a flying height measurement method and system which can accommodate a tendency that the flying height decreases according to a high capacity of a hard disk, without using an additional glass disk.

According to an aspect of the present invention, a method of measuring a flying height includes rotating a disk having at least one protrusion protruding higher than a minimum flying height of a head assembly that is a subject to measurement of a flying height of a slider of the head assembly with respect to the disk. An upper end portion of the protrusion is cut by the slider according to the rotation of the disk and the height of the cut protrusion is measured using a measurement apparatus.

According to another aspect of the present invention, a system of measuring a flying height has a head assembly that is subject to measurement of a flying height, a disk having at least one protrusion protruding higher than a minimum flying height of the head assembly and a slider of the head assembly is floated by rotation of the disk so that an upper portion of the protrusion protruding higher than a flying height of the slider is cut by the slider. A measurement apparatus measures a height of the protrusion cut by the slider of the head assembly floated according to the rotation of the disk.

The head assembly is a magnetic head assembly and the disk is a magnetic recording disk. The measurement apparatus is an atomic force microscopy (AFM). The protrusion is formed by generation of asperities due to migration of a substance of a base layer of the disk.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
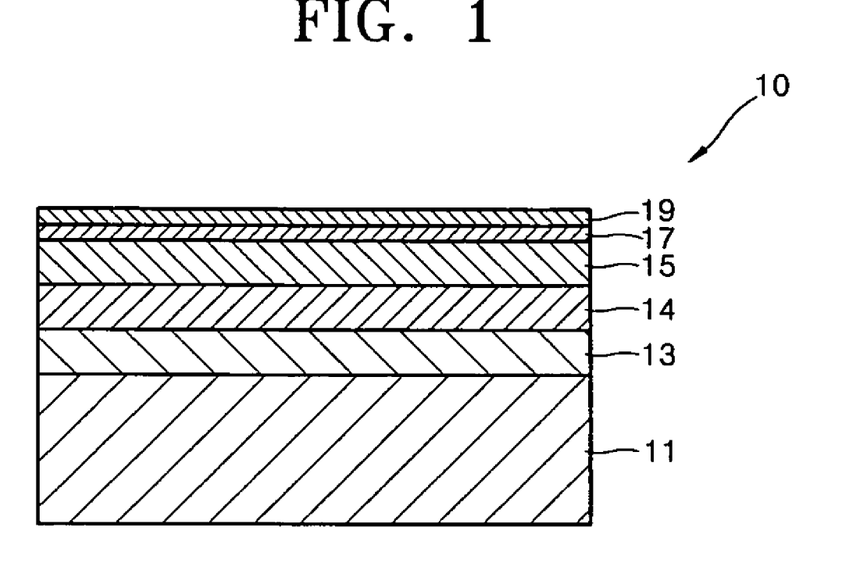
FIG. 1 is a sectional view illustrating the layer structure of a magnetic recording disk.

Referring to FIG. 1, a magnetic recording disk 10 includes a substrate 11, a base layer 13, and a magnetic recording layer 15. The substrate 11 is made of an aluminum substance, for example, an aluminum-magnesium (Al—Mg) alloy.

When the magnetic recording layer 15 is a perpendicular magnetic recording layer, as shown in FIG. 1, an under layer 14 to induce a perpendicular alignment of the magnetic recording layer 15 is further provided on the lower surface of the magnetic layer 15, that is, between the base layer 13 and the magnetic recording layer 15. The under layer 14 may be made of chromium (Cr).

The base layer 13 made of Ni—P or other suitable material, allows the magnetic recording layer 15 to be formed with a more uniform layer so that a stable magnetic performance can be maintained. Also, the base layer 13 lessens changes in the magnetic performance of the magnetic recording layer 15 due to a thermal/dynamic effect received from the substrate 11. The base layer 13 provides structural support to an aluminum layer forming the substrate 11 and improves the manufacturability when the Cr layer forming the under layer 14 is formed.

The magnetic recording disk 10 further includes a protective layer 17 to protect the magnetic recording layer 15 from an external impact. The protective layer 17 can be made of, for example, a carbon based substance such as diamond-like carbon (DLC). In this embodiment the magnetic recording disk 10 further includes a lubricant layer 19 on the protective layer 17 for a smooth operation.

The magnetic recording disk 10 having the above layer structure is formed by sputtering multiple layers according to the respective functions on the substrate 11 of aluminum substance.

Figure 2:
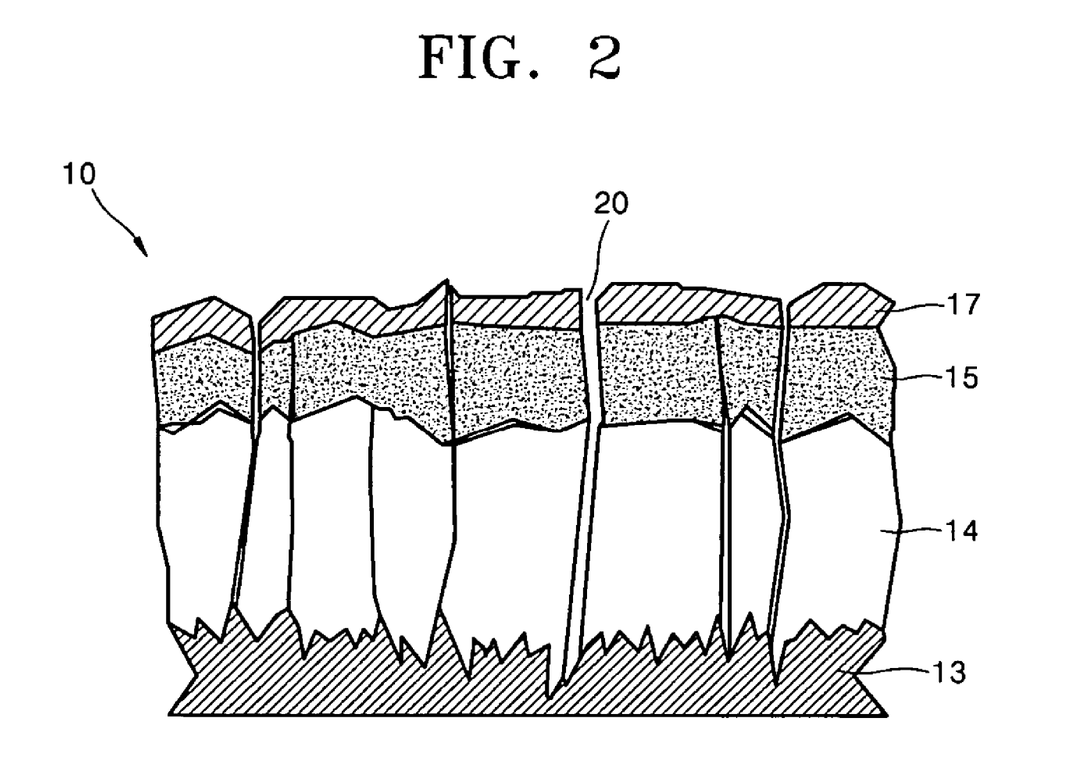
FIG. 2 is a sectional view illustrating a pinhole formed in the magnetic recording disk.

In the magnetic recording disk 10, the protective layer 17 made of a carbon based substance is formed on the magnetic recording disk 10 to prevent corrosion when the magnetic recording disk 10 is in a high temperature and high humidity environment. However, because the layers under the protective layer 17 are not completely sealed by the protective layer 17, a plurality of pinholes 20 and deep textures are generated in the magnetic recording disk 10, as shown in FIG. 2, so that the nickel substance forming the base layer 13 is migrated.

Figure 3:
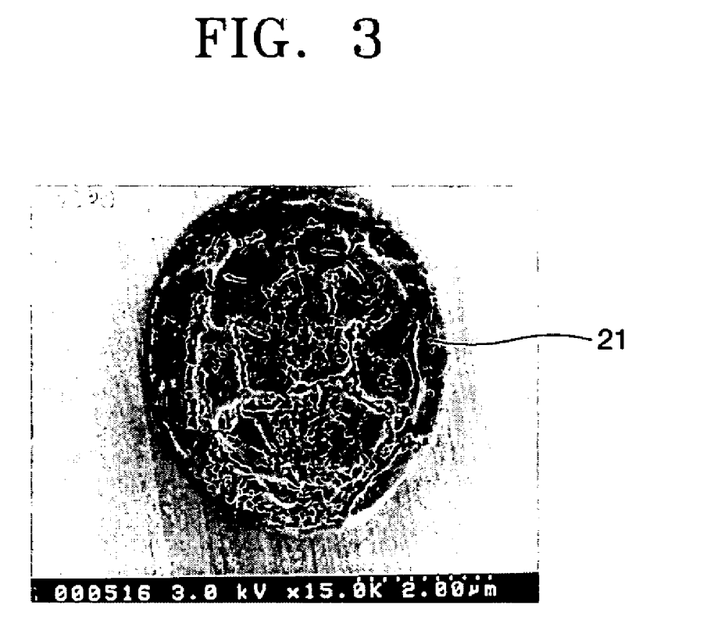
FIG. 3 is an image obtained by observing a surface of a magnetic recording disk with an energy of 3.0 kV.
Figure 4:
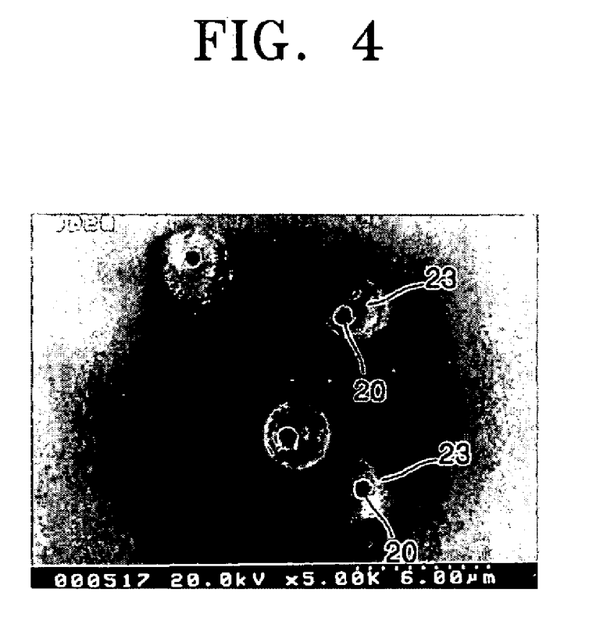
FIG. 4 is an image obtained by observing a surface of a magnetic recording disk with an energy of 20 kV.

FIG. 3 is an image obtained by observing the surface of a magnetic recording disk with an energy of 3.0 kV. FIG. 4 is an image obtained by observing the surface of a magnetic recording disk with an energy of 20 kV. FIGS. 3 and 4 show the actual shapes of asperities 21 and 23 formed by Ni-migration through pinholes. As shown in FIGS. 3 and 4, the asperities 21 and 23 are generated through the pinhole 20 on the surface of the magnetic recording disk.

When an image is obtained with an energy of 3.0 kV, as shown in FIG. 3, a pinhole is not observed at the central portion of the asperity 21. However, when an image is obtained with an energy of 20 kV, as shown in FIG. 4, the pinhole 20 can be seen from all the asperities 23.

The pinhole 20 is not observed with a relatively low energy of about 3 kV as shown in FIG. 3 while the pinhole 20 is observed with a high energy of about 20 kV as shown in FIG. 4. This is because, when migration of the substance of the base layer 13 occurs, although the pinhole 20 is covered by corrosion products, it is assumed that the density of the corrosion products covering the pinhole 20 is very low and the layer itself is thin.

As can be seen from FIGS. 2 and 4, the pinhole 20 or deep texture is generated in the magnetic recording disk 10 during sputtering. The mechanism of Ni-migration through the pinhole 20 is described below.

Corrosive gas or moisture present on the surface of a part in a magnetic recording disk drive, for example, a hard disk drive, is moved to a surface of the magnetic recording disk 10 by heat generated during the operation of the hard disk drive or during an experiment under a high temperature and high humidity environment. The corrosive gas or moisture on the surface of the magnetic recording disk 10 intrudes to the base layer 13, in this embodiment it is a nickel layer, through the pinhole 20 formed in the magnetic recording disk 10 during sputtering and reacts with nickel to produce a corrosion product. The corrosion product migrates to the surface of the magnetic recording disk 10. Thus, the asperities 21 and 23 are generated on the surface of the magnetic recording disk 10.

Figure 5:
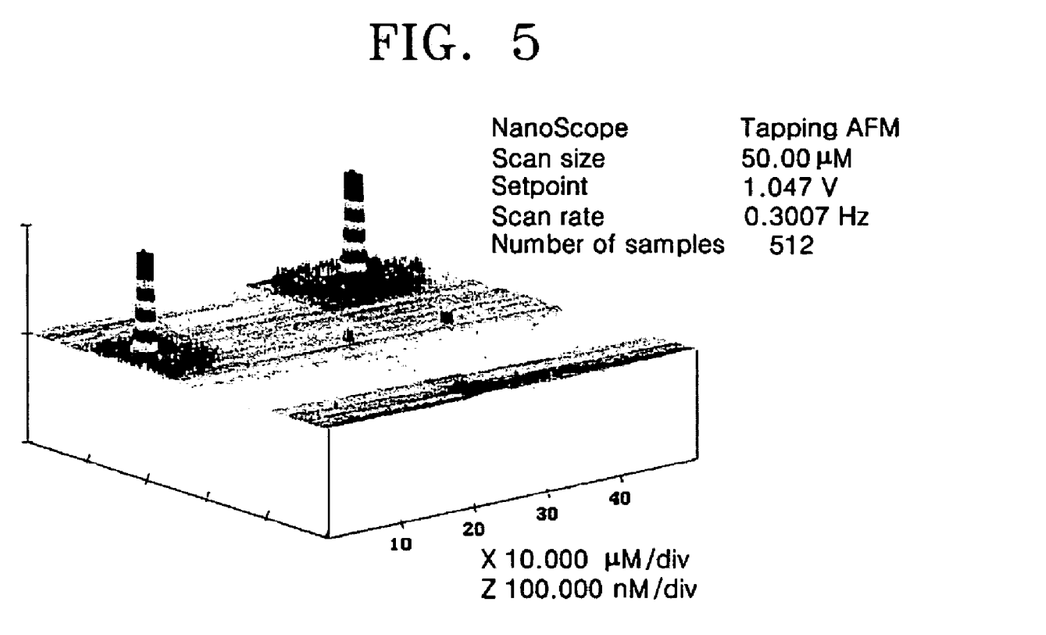
FIG. 5 shows the 3-D shape of the asperities generated on the surface of a magnetic recording disk by migration of a nickel substance.
Figure 6:
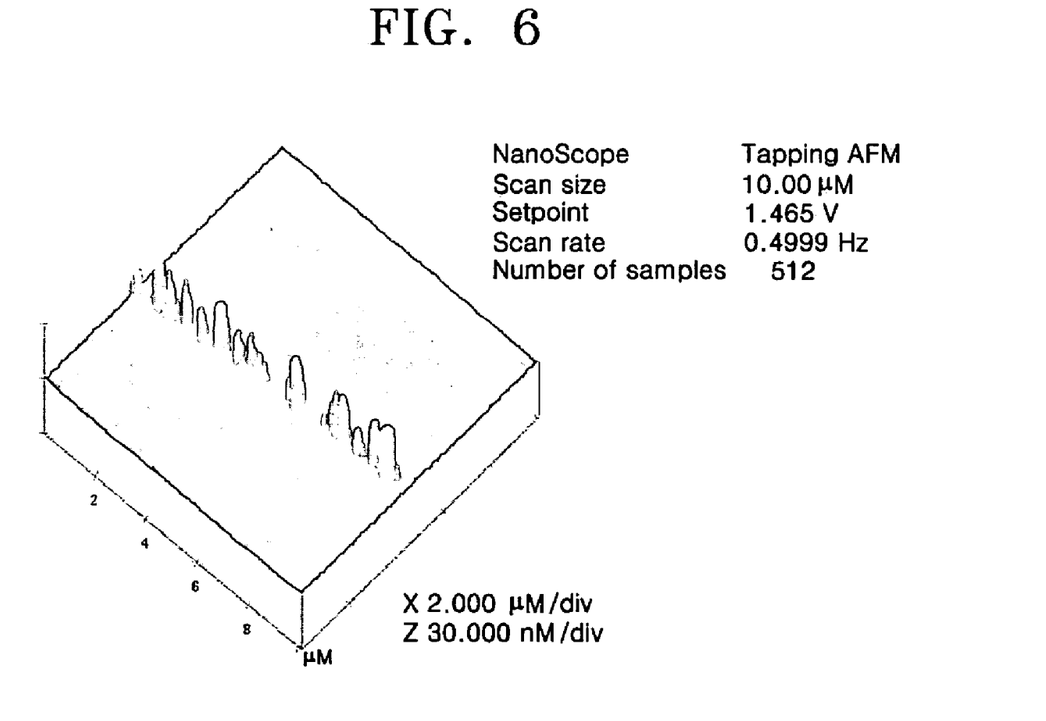
FIG. 6 shows the 3-D image of the asperities generated by the nickel-migration along the texture of the magnetic recording disk.

FIG. 5 shows the 3-D shape of the asperities generated on the surface of a magnetic recording disk by migration of a nickel substance. FIG. 6 shows the asperities generated by the nickel-migration along the texture of the magnetic recording disk. FIGS. 5 and 6 show images measured by an AFM (atomic force microscopy). As shown in FIG. 6, the asperities due to the nickel-migration can be generated along the texture of the disk.

Figure 7A:
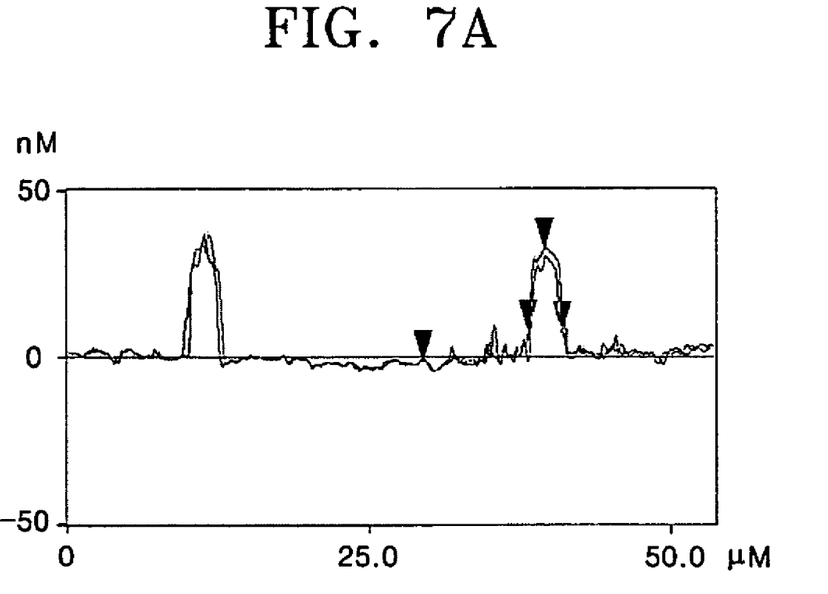
FIG. 7A is a graph showing the result of analysis of a section obtained by measuring the asperity generated by the migration of a nickel substance by using an AFM.
Figure 7B:
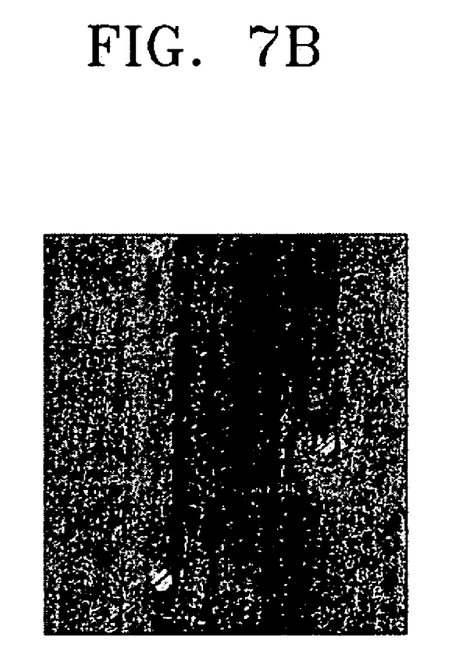
FIG. 7B is an image of the surface of the magnetic recording disk used for obtaining the result of the of FIG. 7A.

FIG. 7A shows the result of an analysis of a section of the magnetic recording disk obtained by measuring the asperity generated by the migration of a nickel substance using an AFM. In FIG. 7A, the unit of the vertical axis is nm while the unit of the horizontal axis μm. The measurement was made along two scan lines slightly deviated from each other as shown in FIG. 7B. In FIG. 7B, portions marked in white along the scan lines are asperities.

As can be seen from FIGS. 5 through 7B, the asperities are formed on the surface of the magnetic recording disk due to the migration of a nickel substance and the height of the asperities is tens of nanometers higher than a desired flying height of a magnetic head assembly. The sectional area of the asperity is not relatively large.

Figure 8A:
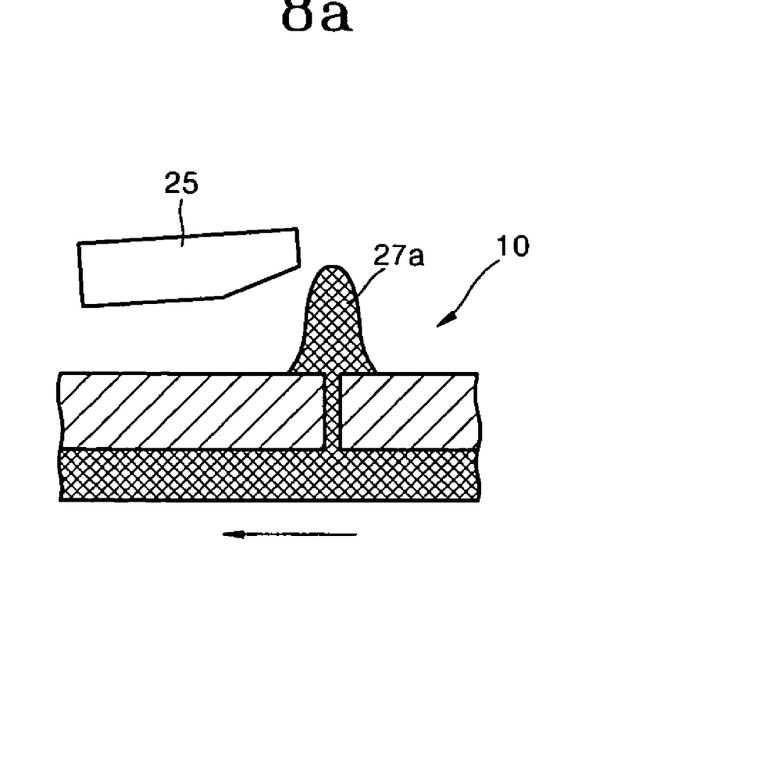
FIG. 8A is a view showing a state before the slider floated as much as the flying height from the surface of the magnetic recording medium due to the rotation of the magnetic recording medium hits a protrusion protruding higher than the flying height.
Figure 8B:
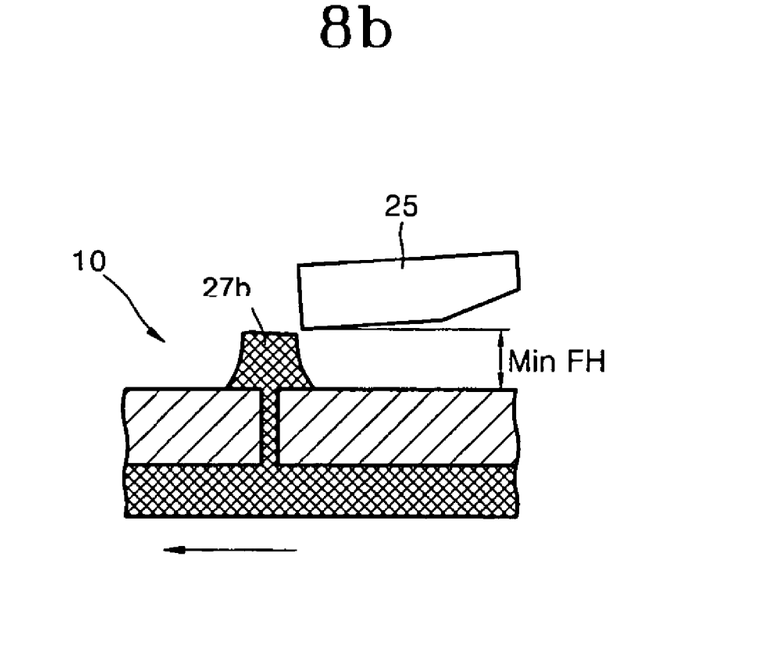
FIG. 8B is a view showing a state after the slider floated as much as the flying height from the surface of the magnetic recording medium due to the rotation of the magnetic recording medium hits the protrusion protruding higher than the flying height so that an upper portion of the protrusion is cut while the remaining portion corresponding to the minimum flying height (Min FH) of the head is left.

Accordingly, when a magnetic recording disk with a protrusion higher than a flying height is formed on the surface by the asperity generated due to the migration of a substance of the base layer, is used, as shown in FIGS. 8A and 8B, a slider 25, for example, a magnetic head slider, floated as high as a flying height from the surface of the magnetic recording disk 10 by the rotation of the magnetic recording disk 10 hits a portion of the protrusion protruding higher than the flying height. Then, a portion of the protrusion corresponding to a minimum flying height (Min FH) of the head remains on the surface of the magnetic recording disk 10 while an upper portion of the protrusion is cut away. In FIG. 8A, reference numeral 27a denotes a protrusion before being cut. In FIG. 8B, reference numeral 27b denotes a protrusion after being cut.

Figure 9A:
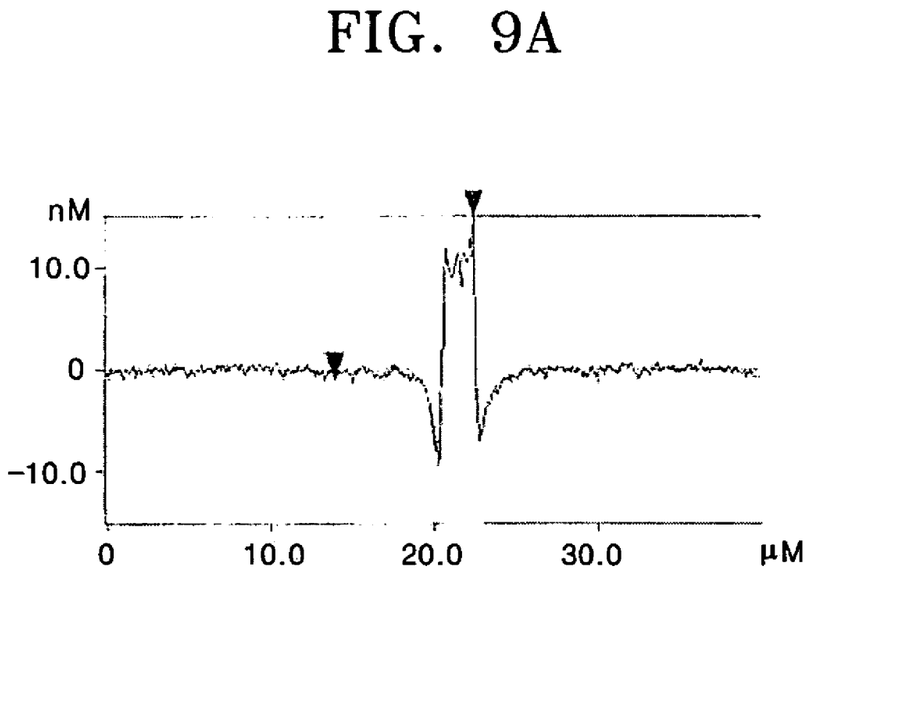
FIG. 9A is a graph showing the result of analysis of a section obtained by measuring a protrusion cut by the slider by using an AFM.
Figure 9B:
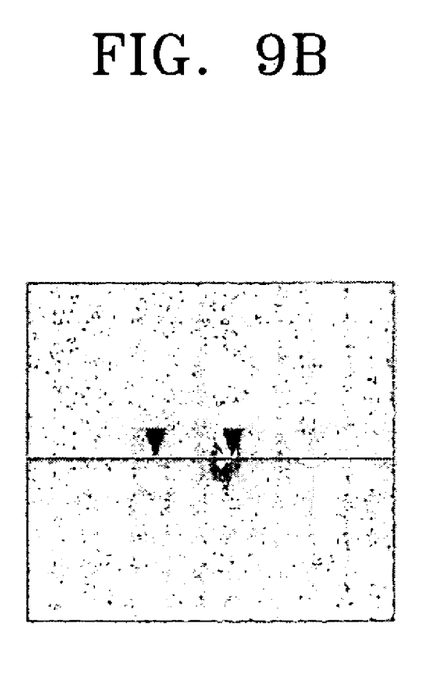
FIG. 9B is an image showing a surface of the magnetic recording disk used to obtain the result of FIG. 9A.

FIG. 9A shows the result of an analysis of a section obtained by measuring a protrusion cut by the slider using an AFM. The measurement was made along the scan line shown in FIG. 9B. In FIG. 9B, the portion marked in white along the scan line is the asperity.

Figure 10A:
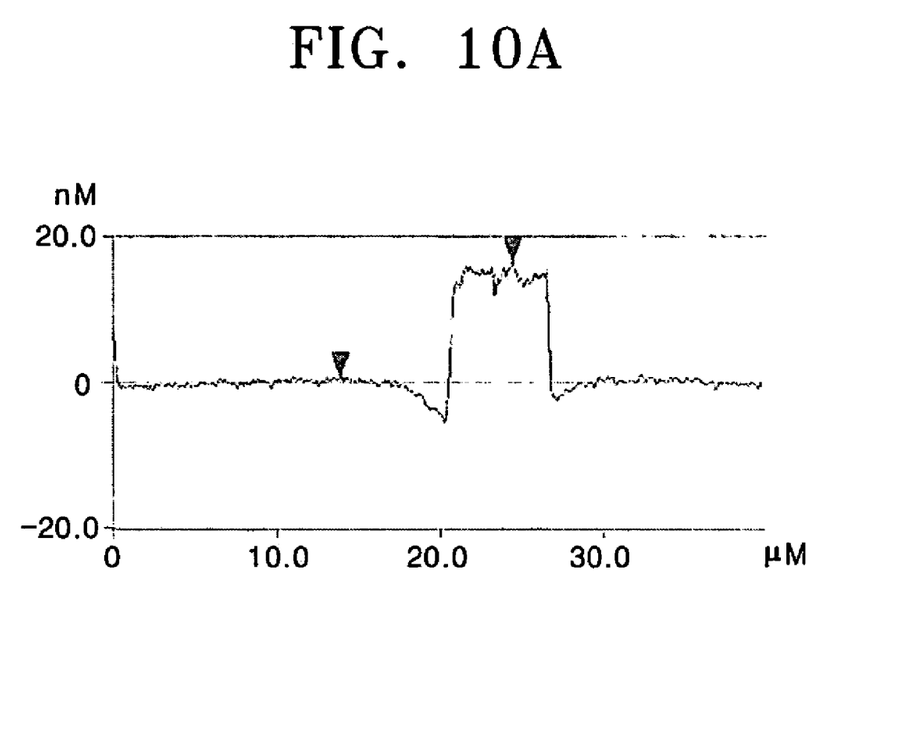
FIG. 10A is a graph showing the result of analysis of a section obtained by measuring another protrusion cut by the slider by using an AFM.
Figure 10B:
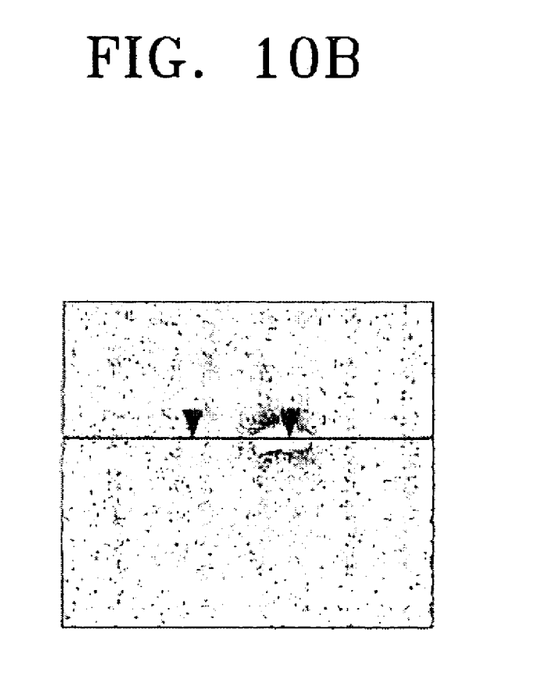
FIG. 10B is an image showing a surface of the magnetic recording disk used to obtain the result of FIG. 10A.

As another example of a measurement of another cut protrusion using an AFM, FIG. 10A shows the result of an analysis of a section obtained by measuring the protrusion cut by the slider using an AFM. The measurement was made along the scan line shown in FIG. 10B. In FIG. 10B, the portion marked in white along the scan line is the asperity.

Thus, when the upper portion of the protrusion formed by the migration of a nickel substance is cut by the slider of a magnetic head assembly and then the height of the cut protrusion is measured, for example, using an AFM, the flying height of the head at its lowest position can be accurately measured.

It is a beneficial feature of the present invention to measure a flying height of a magnetic head assembly by utilizing the fact that an asperity is formed on the surface of a disk by the migration mechanism of a base layer substance.

Figure 11:
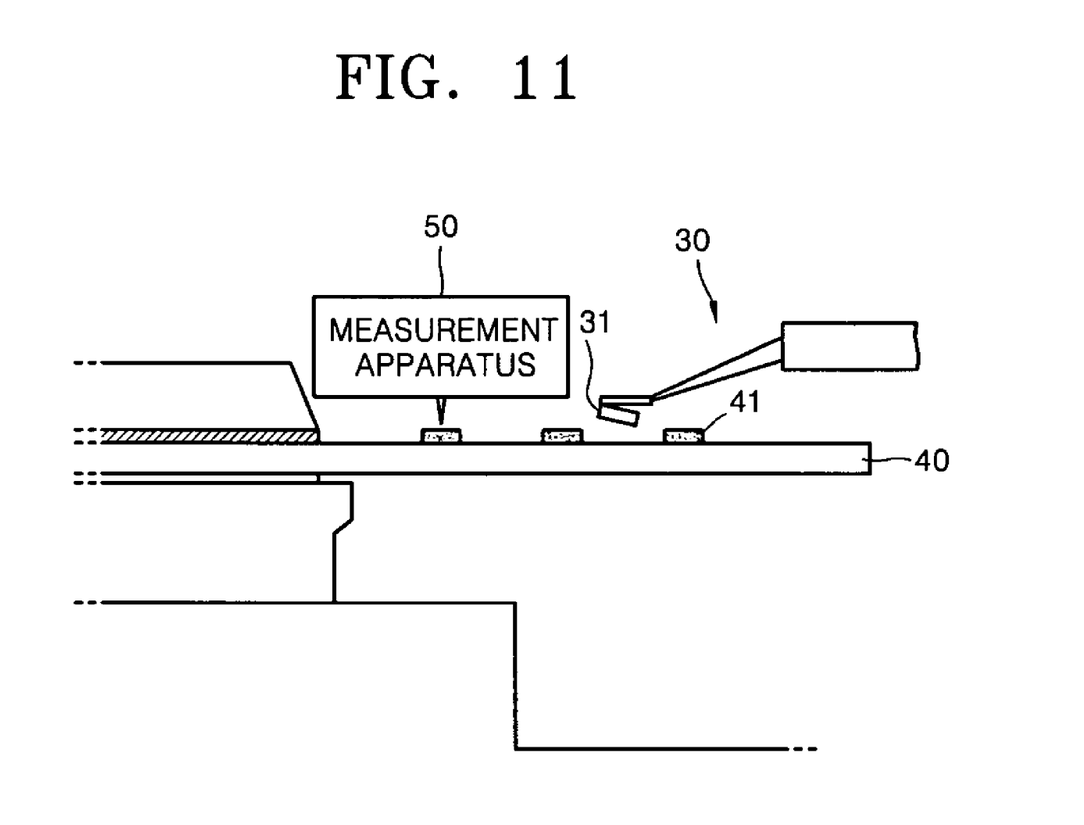
FIG. 11 is a view illustrating the structure of a flying height measurement system according to the present invention.

FIG. 11 shows a structure of a flying height measurement system according to an embodiment of the present invention.

Referring to FIG. 11, a flying height measurement system according to the present invention includes a magnetic head assembly 30 being an object of measurement of flying height, a magnetic recording disk 40 having at least one protrusion 41 protruding higher than the minimum flying height of the magnetic head assembly 30, and a measuring apparatus 50 to physically measure the height of the protrusion 41 cut by a slider 31 of the magnetic head assembly 30.

The magnetic head assembly 30 includes the slider 31 floated by the rotation of the magnetic recording disk 40, for example, a hard disk, and a magnetic head (not shown) that is provided at a leading end portion of the slider 31. The flying height of the slider 31 is the gap between the lowest end portion of the slider 31 floated with respect to the disk 40 and a reference surface of the disk 40, during the rotation of the disk 40. The lowest end portion of the slider 31 in a floated state with respect to the disk 40 is the leading end portion of the slider 31 where the magnetic head is disposed. Actually, in the present invention, the flying height of the slider 31 also refers to a flying height of the magnetic head.

It is understood that the magnetic head assembly and the flying height measurement system according to the present invention can measure the minimum flying height of the slider regardless of the type of the magnetic head assembly used. Since the magnetic head assembly is widely known in the field of magnetic recording/reproduction, a detailed description thereof will be omitted.

Protrusions 41 are formed on the surface of a magnetic recording disk 40 by a migration mechanism of nickel which is a substance forming the disk, in particular, the base layer. When the magnetic recording disk 40 is rotated, the slider 31 of the magnetic head assembly 30 is floated above the surface of the magnetic recording disk 40 to a flying height. During the rotation of the magnetic recording disk 40, the lowest portion of the slider 31 hits the protrusion 41 protruding on the surface of the magnetic recording disk 40 to be higher than the minimum flying height of the slider 31. As a result, the slider 31 cuts the protrusions 41 to a height corresponding to the minimum flying height of the slider 31 or protrusions 41 lower than the minimum flying height are left on the surface of the magnetic recording disk 40.

The distance from the surface of the magnetic recording disk 40 to the upper end of the protrusion cut by the slider 31 is substantially similar to the minimum flying height of the slider 31. Thus, the minimum flying height of the slider 31 can be obtained by measuring the height of the protrusion 41 cut by the slider 31 using the measuring apparatus 50.

In the flying height measurement system according to the present invention, the magnetic recording disk 40, used to measure the flying height of the magnetic head assembly, may be a magnetic recording disk that cannot be used commercially as a magnetic recording and/or reproduction disk due to a lot of defects. Also, the magnetic recording disk 40 may have uneven protrusions that are intentionally formed instead of a magnetic recording disk on which protrusions are formed by the migration of the substance of the base layer, in particular, nickel. Of course, protrusions protruding higher than the minimum flying height of the magnetic head assembly subject to the measurement must be formed on the surface of the magnetic recording disk.

In the meantime, since the minimum flying height of the slider 31 is very low in the range of several nanometers to tens of nanometers due to the high capacity of the magnetic recording disk 40, the measurement apparatus 50 needs to observe the surface of the magnetic recording disk 40 to the degree of an atomic scale.

Thus, in this embodiment, an AFM (atomic force microscopy) is used as the measurement apparatus 50. The AFM is a scanning probe microscopy (SPM) and can obtain 3-dimensional information with respect to the structure of the surface of a substance and can recognize the atomic arrangement of the surface to a degree of Å by a relatively simple method. The AFM has no limit in the electric property of the surface of a substance and can observe without treating the surface of a test sample. Thus, the surface of a solid substance in a solution including a non-conductive substance can be observed by the AFM.

The AFM obtains 3 dimensional surface information by scanning the surface of a substance in 2-dimensions using a tip, which is a small and sharp probe. While a repulsive force between the surface of a test sample and the probe, that is, a distance therebetween, is constantly maintained, the spatial distribution of the height of the probe is converted to an image. Since the repulsive force generally acts to all substances, the AFM can be applied even to a non-conductive substance.

When the AFM capable of observing a surface to a degree of an atomic scale is used as the measurement apparatus 50, protrusions having heights of several nanometers through tens of nanometers can be observed. Thus, the minimum flying height of the slider 31 of the magnetic head assembly 30, which is very low, can be measured. Thus, even when the flying height is sufficiently low to a degree of several nanometers through tens of nanometers according to a high storage capacity, the flying height can be measured.

When the flying height measurement system is completed, the magnetic recording disk 40 is rotated and the slider 31 of the magnetic head assembly 30 is floated. The slider 31 hits and cuts the protrusions on the surface of the magnetic recording disk 40. The surface of the magnetic recording disk 40 is observed using the measurement apparatus 50, for example, the AFM, so that the height of the cut protrusion 41 is measured. Thus, the minimum flying height of the magnetic head assembly 30 subject to the measurement can be obtained. The flying height of the magnetic head assembly 30 subject to the measurement is the height of the cut protrusion 31.

According to the experiment performed by the present inventor, when the flying height of a magnetic head assembly designed to have a flying height of 0.45 μm is measured using the flying height measurement system according to the present invention, a vertical distance from a reference and the minimum flying height of an actual magnetic head assembly are determined to be about 15-16 nm and about 0.6 μ inch, respectively, by measuring asperities cut by the magnetic head assembly using the AFM.

As shown in the above example, the actual flying height of the magnetic head assembly is different from a value designed by computer simulation. According to the flying height measurement apparatus according to the present invention, the actual flying height of the magnetic head assembly can be accurately measured.

According to the present invention, since an actually used disk (a standard magnetic recording disk for the magnetic head assembly) is used unlike a glass disk according to the conventional technology, more reliable flying height data can be obtained. Also, as even lower flying heights are designed, the limit in the conventional light interference type measurement method can be overcome.

In an alternative embodiment, the flying height measurement system may not be made separately from a drive using a magnetic recording disk. That is, a magnetic recording disk on which protrusions protruding higher than the minimum flying height of the magnetic head are formed is installed in an actual drive and rotated and the magnetic head reaches a flying height. Then, the magnetic recording disk is pulled out to check the flying height by using the measurement apparatus, that is, the AFM, or other apparatuses capable of obtaining a precise profile. It is understood that the flying height of multiple sliders may be made using this alternative embodiment at the same time in a hard disk drive having a plurality of disks each with protrusions formed on the surface of the disk.

Although, in the above description and drawings, the flying height of the magnetic head assembly is measured by the flying height measurement system according to the present invention, the present invention is not limited thereto.

That is, the flying height measurement system according to the present invention can be used as a system for measuring a flying height of a head assembly of different types, other than the magnetic head assembly. The flying height measurement system according to the present invention and its measurement principle are not limited to the type of the head assembly so that the type of disk to be used may be changed according to the type of the head assembly subject to the measurement. Here, whether the protrusions are naturally formed or artificially formed, protrusions protruding higher than the minimum flying height of the head assembly subject to the measurement must be formed on the disk.

As described above, in the method and system of measuring a flying height of a magnetic head assembly according to the present invention, a slider of a head assembly is floated with respect to a disk having protrusions protruding higher than the minimum flying height of a head assembly so that an upper portion of the protrusion is cut by the slider. Then, the profile of the surface of the disk having the cut protrusion is measured to determine the flying height of the head assembly so that a tendency of lowering the flying height due to higher storage capacities can be sufficiently addressed.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of measuring a flying height comprising:
    migrating a product to the surface of a disk from a base layer of the disk through a pinhole in the disk to form at least one protrusion protruding higher than a minimum flying height of a head assembly, wherein a slider of the head assembly is subject to measurement of a flying height with respect to the disk;
    rotating the disk;
    cutting an upper end portion of the protrusion by the slider according to the rotation of the disk; and
    measuring a height of the cut protrusion using a measurement apparatus,
    wherein the measurement apparatus is an atomic force microscopy (AFM).

2. The method as claimed in claim 1, wherein the head assembly is a magnetic head assembly and the disk is a magnetic recording disk.

3. A system of measuring a flying height comprising:
    a head assembly subject to measurement of a flying height;
    a disk having a plurality of pinholes;
    at least one protrusion formed by migrating a product to the surface of the disk from a base layer of the disk through the pinholes, the protrusion protruding higher than a minimum flying height of the head assembly and floating a slider of the head assembly by rotation of the disk so that an upper portion of the protrusion protruding higher than a flying height of the slider is cut by the slider; and
    a measurement apparatus to measure a height of the protrusion cut by the slider of the head assembly floated according to the rotation of the disk,
    wherein the measurement apparatus is an atomic force microscopy (AFM).

4. The system as claimed in claim 3, wherein the head assembly is a magnetic head assembly and the disk is a magnetic recording disk.

5. A method of determining the flying height of a slider of a head assembly comprising:
- migrating a product to a surface of a disk from a base layer of the disk through a pinhole in the disk to form a protrusion having a height greater than a flying height of a slider of a head assembly on the surface of the disk;
- cutting the protrusion on the surface of the disk with the slider of the head assembly during rotation of the disk to leave a cut protrusion on the surface of the disk;
- determining an actual flying height of the slider of the head assembly based on the cut protrusion; and
- estimating the flying height of the slider of the magnetic head assembly prior to forming the protrusion on the surface of the disk.

6. The method of claim 5, wherein the determining of the actual flying height comprises measuring the cut protrusion with an AFM.

7. The method of claim 5, wherein the determining of the actual flying height comprises measuring the cut protrusion with a scanning probe microscopy.

8. The method of claim 5, further comprising:
- installing the disk having protrusions formed on the surface in a hard disk drive having the slider of the head assembly; and
- removing the disk from the hard disk drive after the cutting of the protrusion and prior to the determining of the actual flying height of the slider.

9. The method of claim 8, wherein the hard disk drive includes a plurality of disks having protrusions formed on the surface and a plurality of sliders corresponding to the plurality of disks.

10. A head flying height measurement apparatus comprising:
- a disk having a plurality of pinholes and a plurality of protrusions formed by migrating a product to the surface of the disk from a base layer of the disk through the pinholes to form a corrosion product, the protrusion having a height greater than an estimated flying height of a slider formed on a surface of the disk;
- a head assembly of a disk drive having a magnetic head and a slider disposed at an end of the head assembly, wherein the slider floats above the disk when the disk is rotated and cuts the protrusions to leave a portion of each protrusion below a bottom edge of the slider on the surface of the disk; and
- a measurement device, wherein the measurement device measures a height of the portion of the protrusions remaining on the surface of the disk that corresponds to a flying height of the slider,
- wherein the measurement device comprises an AFM.

* * * * *

UNITED STATES PATENT AND TRADEMARK OFFICE
CERTIFICATE OF CORRECTION

PATENT NO.         : 7,545,592 B2
APPLICATION NO.    : 10/735631
DATED              : June 9, 2009
INVENTOR(S)        : Sang-Hyub Lee

Page 1 of 1

It is certified that error appears in the above-identified patent and that said Letters Patent is hereby corrected as shown below:

On the Title Page, Item (56) (FOREIGN PATENT DOCUMENTS), under
"KR    2002-38720    5/2002" insert
--JP    6-215514     8/1994--.

Signed and Sealed this

Third Day of November, 2009

David J. Kappos
*Director of the United States Patent and Trademark Office*